United States Patent [19]
Rhoda et al.

[11] Patent Number: 5,633,093
[45] Date of Patent: May 27, 1997

[54] COUNTERWEIGHT ATTACHMENT TECHNIQUE

[75] Inventors: Donald A. Rhoda; Jeffrey A. Dutkiewicz, both of Toledo; Jerry E. Gould, Columbus, all of Ohio; Anthony M. Cox, Rochester, N.Y.; James T. Reynolds, Toledo, Ohio

[73] Assignee: Dana Corporation, Toledo, Ohio

[21] Appl. No.: 293,179

[22] Filed: Aug. 19, 1994

Related U.S. Application Data

[63] Continuation-in-part of Ser. No. 111,492, Aug. 25, 1993, abandoned, which is a continuation-in-part of Ser. No. 22,757, Feb. 19, 1993, abandoned, which is a continuation of Ser. No. 720,225, Jun. 25, 1991, abandoned.

[51] Int. Cl.$^6$ ............... F16C 3/02; B23K 11/14; B23K 11/20
[52] U.S. Cl. ............... 428/653; 464/180; 219/93; 219/118
[58] Field of Search ............... 428/653, 594, 428/600, 603; 464/180; 219/93, 118, 67

[56] References Cited

U.S. PATENT DOCUMENTS

| | | | |
|---|---|---|---|
| 1,489,699 | 4/1924 | David | 219/137 R |
| 1,872,394 | 8/1932 | Bleicher | 228/173.3 |
| 2,299,001 | 10/1942 | Anderson | 29/434 |
| 3,020,987 | 2/1962 | Schuarte | 219/118 |
| 3,495,319 | 2/1970 | Finnegan | 428/653 |
| 3,630,694 | 12/1971 | Enright et al. | 482/653 |
| 3,664,816 | 5/1972 | Finnegan | 428/653 |
| 3,673,651 | 7/1972 | Stewart | 29/6 |
| 3,687,244 | 8/1972 | Hillegass et al. | 188/218 A |
| 3,798,010 | 3/1974 | Sharp, Jr. et al. | 428/653 |
| 4,295,032 | 10/1981 | Sasaki | 74/603 |
| 4,445,399 | 5/1984 | Sasaki et al. | 219/137 |
| 4,780,593 | 10/1988 | Kato | 219/125.1 |

FOREIGN PATENT DOCUMENTS

| | | |
|---|---|---|
| 0520719A1 | 12/1992 | European Pat. Off. . |
| 3140368A1 | 1/1983 | Germany . |
| 3925181A1 | 2/1990 | Germany . |
| 58-135779 | 12/1983 | Japan . |
| 2147388 | 5/1985 | United Kingdom . |
| 2236163 | 3/1991 | United Kingdom . |

OTHER PUBLICATIONS

Baboian et al., "Joining Dissimilar Metals with Transition Materials," Soc. of Automotive Eng., Automobile Eng'g Meeting, Oct. 18–22, 1976.

Hurlebaus, "Weldability of Texas Instruments Transition Material," TCR 5408, Mar. 9, 1979.

"Recommended Practices for Resistance Welding," American Welding Society (1966), no month.

Nippes et al., "Projection Welding of Steel in Heavy Gages and in Dissimilar Thicknesses," Supp. to Welding Journal, Mar. 1952, pp. 113s–125s.

(List continued on next page.)

*Primary Examiner*—John Zimmerman
*Attorney, Agent, or Firm*—Finnegan, Henderson, Farabow, Garrett & Dunner

[57] ABSTRACT

An apparatus for balancing an aluminum drive shaft uses a transition material to attach steel counterweights to the aluminum drive shaft. The transition material is disposed between an outer surface of the aluminum drive shaft and an inner surface of the steel counterweights. A resistance welding process is then applied to the aluminum drive shaft, the steel counterweights, and the transition material to resistance weld the inner surface of the steel counterweights to the outer surface of the aluminum drive shaft. The transition material has a first surface adjacent to the aluminum drive shaft and a second surface adjacent to the steel counterweights, with the first surface being aluminum and the second surface being steel. In a method of balancing an aluminum drive shaft, a resistance welding process is applied to the aluminum drive shaft, the steel counterweights, and the transition material to resistance weld the inner surface of the steel counterweights to the outer surface of the aluminum drive shaft.

61 Claims, 3 Drawing Sheets

OTHER PUBLICATIONS

Hess et al., "A Study of Projection Welding," Welding Research Supplement, Dec. 1947, pp. 712s–723s.

"Projection Welding," Metals Handbook, vol. 6, American Soc. for Metals (9th ed. 1983), pp. 503–524, no month.

"Clad Metals," Texas Instruments, 1983, no month.

Reich, "Projection Welding of Fasteners," The Welding Journal, Dec. 1946, pp. 1189–1192.

Reich, "Modern Projection Welding," Welding Journal, Aug. 1948, pp. 610–612.

COUNTERWEIGHT ATTACHMENT TECHNIQUE

This application is a continuation-in-part of U.S. application Ser. No. 08/111,492, filed Aug. 25, 1993, now abandoned, which is a continuation-in-part of U.S. patent application Ser. No. 08/022,757, filed Feb. 19, 1993, now abandoned, which is a continuation of U.S. patent application Ser. No. 07/720,225, filed Jun. 25, 1991, now abandoned, the contents of which are relied upon and incorporated by reference.

BACKGROUND OF THE INVENTION

The present invention relates to use of transition materials to attach steel to aluminum. More particularly, the present invention relates to a method for attaching a steel counterweight to an aluminum shaft by projection welding using transition materials. While the invention is subject to a wide range of applications, it is especially suited for use in balancing an aluminum drive shaft for rotation about an axis and will be particularly described in that connection.

Often, it is desirable to employ combinations of materials in order to obtain benefits of the properties of each material. For example, drive shafts for vehicles may be developed of aluminum, which offers substantial weight reduction and reduced rotational inertia over steel drive shafts. However, counterweights must be attachable to the shafts in order to properly balance the shafts. The preferred material for these counterweights is steel, since steel has a significantly greater mass density than aluminum and a much larger piece of aluminum would be required to perform as a counterweight if aluminum were used. Hence, it is desired to combine the light weight, heat conductivity, electrical conductivity, and corrosion resistance properties of aluminum with the greater mass density, high strength, and hardness, of steel. However, joining these two materials presents many problems.

One method of joining aluminum and steel is resistance projection welding. The typical resistance projection welding method of joining aluminum to steel, however, is generally considered infeasible due to formation of undesirable discontinuities or defects along the bond line or weld zone.

Another method of joining aluminum to steel is fusion welding. However, steel and aluminum are of considerably different melting points, making fusion welding difficult. In particular, steel and aluminum form a series of brittle intermetallics. As a result, many problems occur in trying to fusion weld steel to aluminum including discontinuities in the weld line, weak welds between two incompatible materials such as steel and aluminum, breakage due to differential expansion and contraction, diffusion forming brittle intermetallic compounds at the interface between the two materials, high stresses due to residual strains from the welding operation, and galvanic couples that cause corrosion.

It is seen then that there exists a need for a process of attaching steel to aluminum which overcomes the aforementioned problems, including reducing the amount of heat introduced into the aluminum and, thus, the thermal expansion and deformation of the aluminum during attachment to the steel.

SUMMARY OF THE INVENTION

This need is met by the apparatus and method according to the present invention, wherein an aluminum to steel transition material having a projection on the steel side of the material is used to attach steel to aluminum through resistance projection welding. The present invention provides for the use of transition materials, which typically comprise two or more layers of different materials which are bonded together. The projection on the steel side of the transition material allows for the metering of heat flow from the steel to the aluminum. Alternatively, the projection can be formed on the inner surface of the steel counterweight to be attached to the aluminum tube instead of the transition material. The projection welding process with a transition material further provides the advantage of eliminating expulsion from the aluminum and minimizing expulsion from the steel.

Additional features and advantages of the invention will be set forth in the description which follows, and in part will be apparent from the description, or may be learned by practice of the invention. The objectives and other advantages of the invention will be realized and attained by the method and apparatus particularly pointed out in the written description and claims as well as the appended drawings.

To achieve these and other advantages and in accordance with the purpose of the invention, as embodied and broadly described,the invention, a method for attaching a steel counterweight to a tubular aluminum drive shaft comprises the steps of disposing a transition material between the outer surface of the aluminum drive shaft and the inner surface of the steel counterweight, and then resistance welding the counterweight to the aluminum drive shaft by passing an electrical current through the counterweight, the transition material, and the aluminum drive shaft while maintaining pressure on the outer surface of the counterweight against the drive shaft. The surface of the transition material adjacent to the steel counterweight is steel and the surface adjacent to the aluminum drive shaft is aluminum. The steel surface of the transition material also has one or more outward projections for preventing excess heat from being transmitted to the aluminum tube during welding. Alternatively, outward projections can be formed on the inner surface of the steel counterweight instead of the transition material. By performance of this method, a steel-steel bond is created between the inner surface of the counterweight and the steel surface of the transition material and an aluminum-aluminum bond is created between the aluminum surface of the transition material and the aluminum drive shaft.

An advantage of the use of a transition material during the resistance welding process is the reduction of the amount of heat introduced to the aluminum drive shaft, which reduces the thermal expansion and deformation of the drive shaft during the counterweight attachment. The resistance welding process provides the further advantage of eliminating expulsion from the aluminum and minimizing expulsion from the steel during the welding process.

In a preferred embodiment of the present invention, the transition material has at least two layers including a steel layer and an aluminum layer. In practice, the thickness of the steel layer may be substantially less than the thickness of the steel counterweight.

The shape of the outward projection in the steel surface of the transition material is preferably a C-shaped ring having an opening in one part of the ring to allow gases to escape, although the shape of the projection may be made in many different configurations from a square with an opening to several parallel lines. Alternatively, an outward projection in the shape of ring can be formed on the inner surface of the steel counterweight instead of the transition material. The outward projection on the steel surface of the transition material or the inner surface of the steel counterweight prevents excess heat from being transmitted to the aluminum drive shaft during the resistance welding process.

This method can be used to fabricate an aluminum drive shaft that is balanced during rotation by attaching one or more steel counterweights. Thus, a drive shaft according to the invention comprises: an aluminum tube, a steel counterweight which is attached to the aluminum tube, and a transition material disposed between the aluminum tube and the counterweight. The surface of the transition material adjacent to the steel counterweight is steel and the surface adjacent to the aluminum drive shaft is aluminum. Either the steel surface of the transition material or the inner surface of the steel counterweight has an outward projection for preventing excess heat from being transmitted to the aluminum tube during welding. A steel-steel bond is exists between the inner surface of the counterweight and the steel surface of the transition material and an aluminum-aluminum bond exists between the aluminum surface of the transition material and the aluminum drive shaft.

Similarly, the present invention encompasses a metallic composite adapted for attachment to a tubular aluminum drive shaft by resistance welding for balancing the aluminum drive shaft during rotation. The metallic composite according to the invention comprises a steel counterweight and a transition material. The surface of the transition material adjacent to the steel counterweight is steel and the opposite surface for attachment to the aluminum drive shaft is aluminum. Either the steel surface of the transition material or the inner surface of the steel counterweight adjacent to the transition material also has an outward projection for preventing excess heat from being transmitted to the aluminum tube during welding. The steel surface of the transition material is tack welded to the inner surface of the steel counterweight.

Other objects and advantages of the invention will be apparent from the following description, the accompanying drawings and the appended claims. It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate the embodiment of the invention, and together with the description serve to explain the principles of the invention.

DETAILED DESCRIPTION OF THE PREFERRED EMBODIMENTS

The present invention provides a method for resistance welding steel counterweights to aluminum tube drive shafts, and an improved drive shaft made by this method, wherein an aluminum to steel transition material is used to attach steel counterweights to aluminum drive shafts through resistance projection welding. A transition material is disposed between the outer surface of an aluminum drive shaft and the inner surface of a steel counterweight. The surface of the transition material adjacent to the drive shaft is aluminum, and the surface of the transition material adjacent to the counterweight is steel.

During the resistance welding process, heat generated in the steel counterweight forms a steel-steel bond between the counterweight and the surface of the transition material adjacent to the counterweight. Heat lost from this weld is conducted into the aluminum, forming an aluminum-aluminum bond between the drive shaft and the surface of the transition material adjacent to the drive shaft. A plurality of geometric shapes may be formed on the surface of the plurality material which is adjacent to the counterweight, or on the inner surface of the steel counterweight which is adjacent to the transition material, to localize the application of heat to the transition material and prevent excess heat from being transmitted to the aluminum so as to cause undesirable melting.

Figure 1:
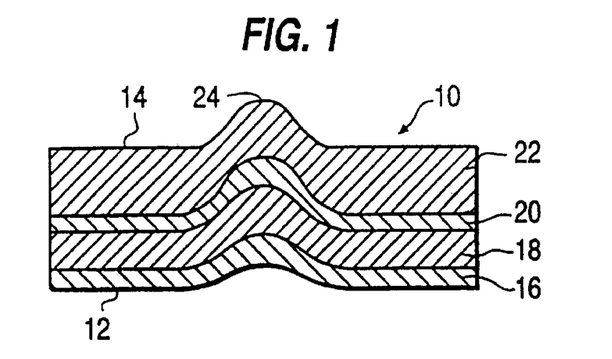
FIG. 1 is a cross-sectional view of the transition material used to attach steel counterweights to aluminum drive shafts.

Referring now to the drawings, in FIG. 1 there is illustrated a cross sectional view of the layers comprising the transition material of the present invention. The transition material, generally designated 10, has a first surface 12 and a second surface 14. Surface 12 is aluminum and surface 14 is steel. The transition material 10 is also comprised of at least two, and preferably four, layers 16, 18, 20, and 22. Layers 16, 18, and 20 are aluminum layers of varying grades. In a preferred embodiment of the present invention, layers 16 and 20 comprise aluminum 1145, and layer 18 comprises aluminum 5052. The fourth layer 22 is a steel layer, preferably low carbon steel such as steel 1008. The total thickness of transition material 10 may range from 0.050 to 0.060 inches and is preferably 0.060 inches thick. The ratio of aluminum (layers 16, 18, and 20) to steel (layer 22) may vary from 50% aluminum and 50% steel up to the presently preferred ratio of 70% aluminum to 30% steel. A transition material of this type is available from Texas Instruments.

Figure 2A:
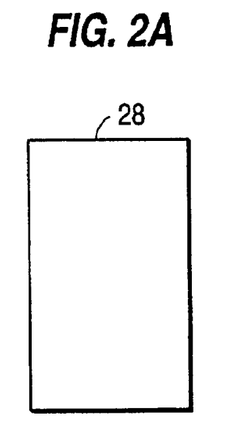
FIG. 2A is a plan view of a steel counterweight.
Figure 2B:
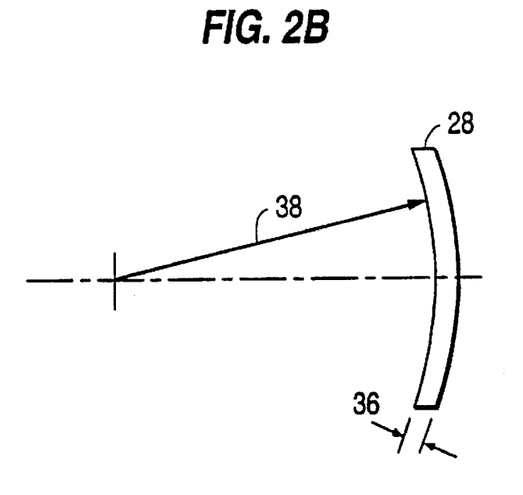
FIG. 2B is a side view of the steel counterweight in FIG. 2A.

Continuing with the drawings, the transition material 10 permits the attachment of a steel counterweight 28, shown in FIGS. 2A and 2B, to an aluminum drive shaft. In a preferred embodiment, the steel counterweight is made of low carbon steel, such as steel 1008, the same as layer 22 of transition material 10. As shown in FIG. 2A, the counterweight is typically rectangular in shape and may come in a variety of weights and sizes. For example, in the present application of the invention to aluminum drive shafts, the thickness 36 of counterweight 28, as shown in FIG. 2B, may range from 0.065 inches to 0.134 inches, depending on the desired weight. Likewise, counterweight 28 comes in various sizes ranging from approximately 0.6 inches by 0.6 inches to 1 inch by over 2 inches. The corresponding weights range from approximately 0.1 ounce to over 1.3 ounces.

Also as shown in FIG. 2B, counterweight 28 is preferably curved having a radius 38 that is slightly greater than the radius of the aluminum tube to which it will be attached. For example, for attachment to an aluminum tube having a radius of 2 inches, the radius 38 of the curve of counterweight 28 is approximately 2.45 inches.

Figure 3A:
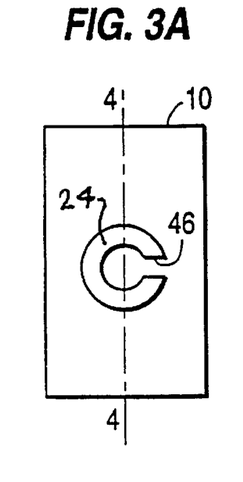
FIG. 3A is a plan view of one embodiment of the transition material.

As noted above, the preferred thickness of the transition material 10 is approximately 0.060 inches, whereas the corresponding thickness of steel counterweight 28 may range from 0.065 inches to 0.134 inches. Steel layer 22 in transition material 10 may therefore be much thinner than the steel of the counterweight to be attached to the aluminum tube. In order to provide proper heat balance between the relatively thin transition material 10 and the relatively thick attached steel counterweight 28, one or more geometric shapes are formed, projecting outwardly, on the transition material 10. The projecting geometric shape 24 is formed by stamping transition material 10 and projects outwardly on the steel surface 14 of the transition material 10, as illustrated in FIGS. 1 and 3A. The projecting geometric shape 24 concentrates the heat generation in the steel counterweight 28 at the steel surface 14 and improves the heat balance during the resistance welding process, preventing excess heat from being transmitted to the aluminum drive shaft.

Figure 3B:
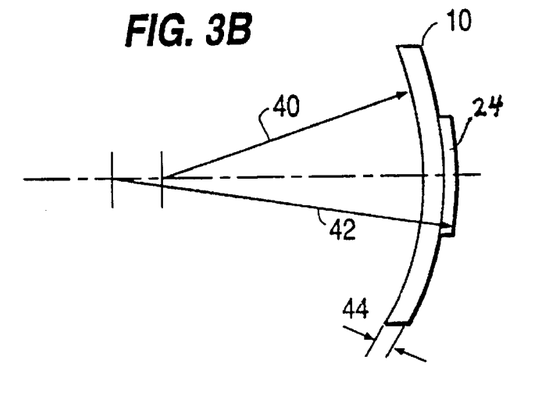
FIG. 3B is a side view of the transition material in FIG. 3A.

Transition material 10 is cut into a piece that is the same size as the counterweight 28 which is to be attached to the aluminum tube. As shown in FIG. 3B, transition material 10 is preferably curved having a radius 40 that is the same as the radius of the aluminum tube to which the transition material and steel counterweight will be attached. The top of projection 24 in transition material 10, however, should have the same curvature as the steel counterweight which will be attached to it. As noted above, counterweight 28 is curved with a radius 38 that is slightly greater than the radius of the aluminum tube. Therefore, the curvature of the top of projection 24 should have a radius 42 that is the same as radius 38 of counterweight 28. Also as noted above, transition material 10 has a preferred thickness 44 of 0.060 inches.

The geometric shape of projection 24 in transition material 10 may be any of a variety of shapes, depending on the weight and size of the steel counterweight 28 to be attached to the aluminum drive shaft. As shown in FIG. 3A, the shape of projection 24 is preferably a ring having an opening 46 in one part of this ring. This "C"-shaped projection adds surface area for the weld while leaving an opening for gases to escape. While the presently preferred shape of the projection in transition material 10 is the "C" shape illustrated in FIG. 3A, the geometric shape of the projection may be made in many different configurations from a square with an opening to several parallel lines.

Figure 4:
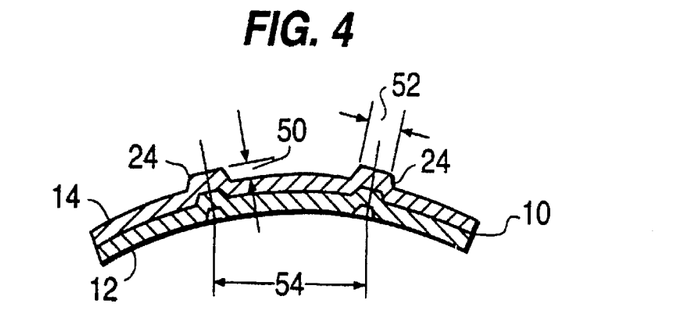
FIG. 4 is a cross-section of the transition material along line 4—4 in FIG. 3A.

Additional details of the preferred geometric shape of the projection are shown in FIG. 4. FIG. 4 is a cross-section of transition material 10 in FIG. 3A along line 4—4 bisecting the material. Projection 24, which is stamped in transition material 10, has a height 50 above surface 14 of the transition material that is 0.028 inches, which is a standard for projection welding. The width 52 of the projection is preferably 0.119 inches, and the "mean crater" diameter 54 of the ring-shaped projection ranges from 0.200 to 0.400 inches and is preferably 0.400 inches.

Figure 5:
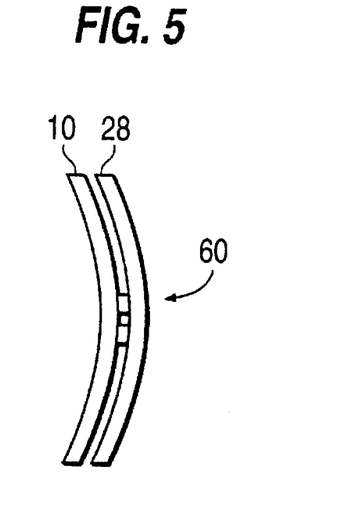
FIG. 5 is a side view of the assembly of the counterweight and the transition material.

Before attaching the counterweight to the aluminum tube or drive shaft, transition material 10 is prewelded by a tack weld to counterweight 28 as illustrated in FIG. 5. Assembly 60, consisting of transition material 10 and counterweight 28 tack-welded together, is then placed on the aluminum tube and resistance welded to the shaft.

Figure 6:
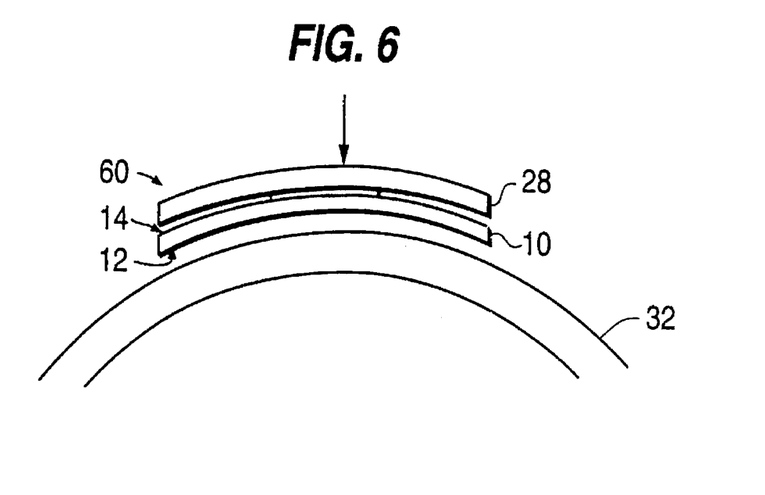
FIG. 6 is an exploded view of an aluminum drive shaft and the counterweight-transition material assembly to be attached to the aluminum drive shaft.

Referring now to FIG. 6, assembly 60 is positioned such that the surface 12 of transition material 10 will contact an outer surface 32 of the aluminum drive shaft 30, in order to create an aluminum-aluminum bond between the aluminum drive shaft 30 and the first surface 12 of the transition material 10, from heat lost during the resistance welding process. Likewise, surface 14 of transition material 10 will contact an inner surface of the steel counterweight 28 in order to create a steel-steel bond between the steel counterweight 28 and the second surface 14 of the transition material 10, from heat generated in the steel counterweight 28 during the resistance welding process. The geometric shape 24 projects outwardly from surface 14 of transition material 10, toward the steel counterweight 28, to concentrate heat generation in the steel counterweight 28 at the steel-steel interface during the resistance welding process.

In order to weld the counterweight and the transition material to the aluminum tube, copper electrodes of a resistance welding apparatus are placed on opposite sides of the aluminum tube. A bottom electrode supports the tube, whereas a top electrode applies pressure to the counterweight. Electrical current is passed between the electrodes through the counterweight, the transition material, and the aluminum tube to effect the weld. Pressure is maintained on the counterweight for a short period of time after the current is turned off.

The parameters such as force and current for resistance welding the steel counterweight to the aluminum drive shaft will vary depending on the size and thickness of the counterweight, the type of transition material used, and the shape of the projection in the transition material. For example, the secondary current may range from 18,000 amperes up to as high as 30,000 amperes, and the number of cycles may vary from 8 to 12. Similarly, the force on the counterweight may range from 350 to 450 lbs.

During such welding, heat generated in the steel counterweight 28 forms a steel-steel bond between the counterweight 28 and the surface 14 of the transition material 10. Aluminum has a much lower melting temperature than steel and therefore requires much less heat to make the aluminum-aluminum bond between the transition material and the aluminum drive shaft. Heat lost from the steel-to-steel weld is conducted into the aluminum, forming a bond between the drive shaft 30 and the surface 12 of the transition material. The projection 24 formed on the surface 14 of the transition material localizes the application of heat to the transition material 10 and prevents excess heat from being transmitted to the aluminum drive shaft 30, so as to prevent undesirable melting or warping.

Instead of projections in the transition material, the steel counterweight can also be attached to the aluminum tube by using a projection or projections on the inner surface of the steel counterweight adjacent to the steel surface of the transition material. This second embodiment of the invention is illustrated in FIGS. 7A, 7B, 7C, and 8.

Figure 7A:
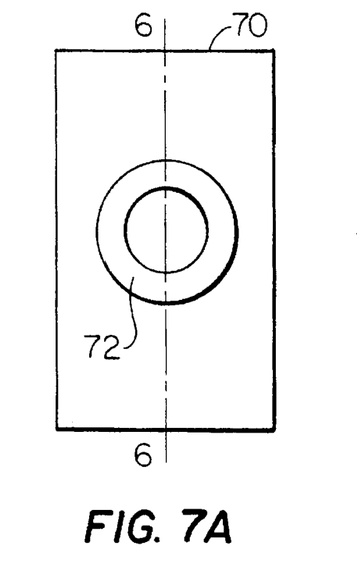
FIG. 7A is a plan view of a second embodiment of the steel counterweight with a projection on the inner surface.
Figure 7B:
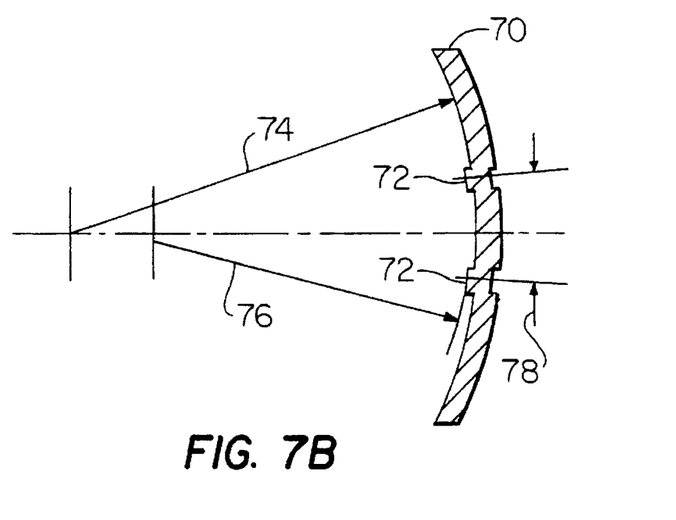
FIG. 7B is a cross-section of the steel counterweight along the line 6—6 in FIG. 7A.
Figure 7C:
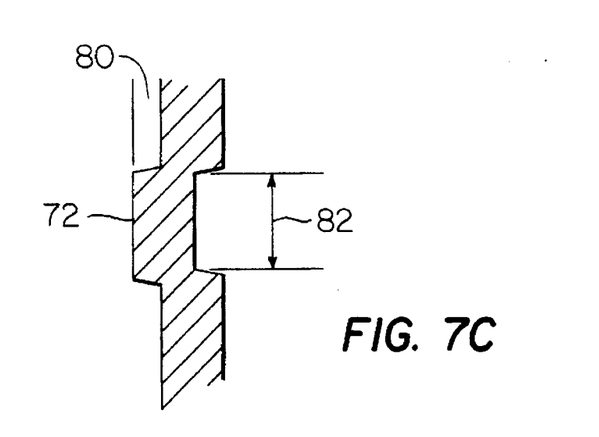
FIG. 7C is an expanded view of the projection in the steel counterweight in FIG. 7B.

Specifically, FIGS. 7A, 7B, and 7C show a steel counterweight 70 having a projection 72 on the inner surface. The steel counterweight 70 is rectangular in shape and may come in a variety of weights and sizes. The counterweight is preferably made of low carbon steel, the same as the steel surface of the transition material.

A geometric shape 72, projecting outwardly from the inner surface of the counterweight 70, is formed by stamping the counterweight. Like the projection in the transition material described above, the projection in the steel counterweight concentrates the heat generation in the counterweight and the steel surface of the transition material, and prevents excess heat from being transmitted to the aluminum drive shaft. The geometric shape in the steel counterweight may be in any of a variety of shapes, depending on the size and weight of the counterweight. As shown in FIG. 7A, the shape of the projection 72 is preferably a ring, although the geometric shape of the projection may be made in many different configurations.

FIG. 7B is a cross-section of the counterweight 70 in FIG. 7A along the line 6—6 bisecting the counterweight. As shown in FIG. 7B, the steel counterweight 70 is preferably curved, having a radius 74 that is slightly greater than the radius of the aluminum tube to which it will be attached. For example, for attachment to an aluminum tube having a radius of 2 inches, the radius 74 of the curve of the counterweight 70 is approximately 2.45 inches. The top of projection 72 in the counterweight, however, should have the same or only a slightly greater curvature as the transition material that will be used to attach the counterweight to the aluminum tube. Thus, where the transition material is curved with a radius that is approximately the same as the aluminum tube, the curvature of the top of the projection 72 should have a radius 76 that is the same or slightly greater. The "mean crater" diameter 78 of the projection 72 may range, for example, from 0.200 inches to 0.400 inches, depending on the counterweight.

Additional details of the projection 72 formed in the steel counterweight 70 are shown in FIG. 7C. Projection 72, which is stamped in the counterweight, has a height 80 above the inner surface of the counterweight that depends on the size and thickness of the counterweight and may, for example, range from approximately 0.023 inches to 0.033 inches, although other ranges might be used. In the embodiment shown in FIG. 7C, the width 82 of the projection 72 is approximately 0.100 to 0.120 inches.

The transition material for attaching steel counterweight 70 to the aluminum tube may be cut into a piece that is the same size as the counterweight. The transition material is essentially the same as illustrated in FIGS. 1, 3A, and 3B, except without projection 24. The transition material is preferably curved with a radius that is the same as the radius of the aluminum tube to which the transition material and the steel counterweight will be attached.

Figure 8:
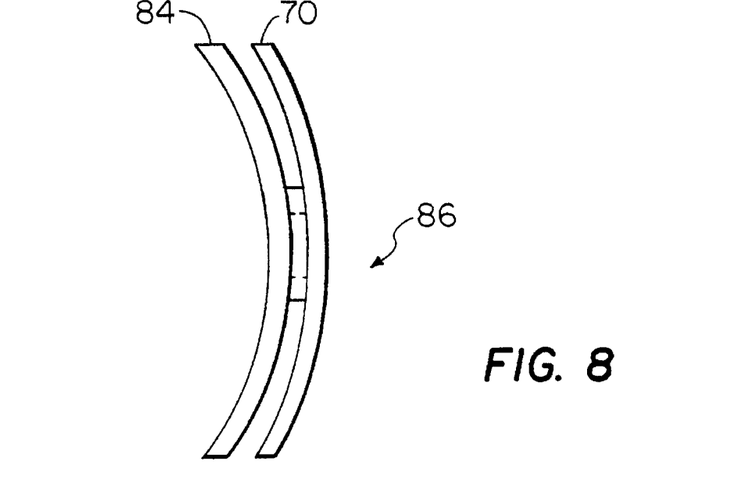
FIG. 8 is a side view of the assembly of the counterweight and the transition material according to the second embodiment.

Before attaching the counterweight to the aluminum tube, the transition material is prewelded by a tackweld to counterweight as illustrated in FIG. 8. Assembly 86, consisting of transition material 84 and counterweight 70 tackwelded together, is then placed on the aluminum tube and resistance welded to the shaft as described above in connection with FIG. 6.

Having described the invention in detail and by reference to the preferred embodiment thereof, it will be apparent that other modifications and variations are possible without departing from the scope of the invention defined in the appended claims.

What is claimed is:

1. A method of attaching a steel counterweight to a tubular aluminum drive shaft, the steel counterweight having an inner surface and an outer surface, and the aluminum drive shaft having an outer surface facing radially away from an axis about which the aluminum drive shaft rotates, the method comprising the steps of:

disposing a transition material between the outer surface of the aluminum drive shaft and the inner surface of the steel counterweight, the transition material having a first surface adjacent to the inner surface of the steel counterweight and a second surface adjacent to the outer surface of the aluminum drive shaft, the first surface being steel and having an outward projection thereon and the second surface being aluminum without outward projections in an area to be welded; and resistance welding the counterweight to the aluminum drive shaft by passing an electrical current through the counterweight, the transition material, and the aluminum drive shaft while maintaining pressure on the outer surface of the counterweight against the drive shaft, thereby creating a steel-steel bond between the inner surface of the counterweight and the first surface of the transition material and an aluminum-aluminum bond between the second surface of the transition material and the outer surface of the aluminum drive shaft.

2. The method of claim 1, wherein the transition material has at least two layers including a steel layer at the first surface and an aluminum layer at the second surface.

3. The method of claim 2, wherein the steel layer has a thickness that is less than the thickness of the counterweight.

4. The method of claim 2, wherein the transition material has a plurality of aluminum layers of varying grades of aluminum.

5. The method of claim 1, wherein the outward projection is in the shape of a ring having an opening in one part of the ring.

6. The method of claim 1, wherein the outward projection is formed by stamping the transition material.

7. The method of claim 1, wherein the transition material has a plurality of outward projections on the first surface of the transition material.

8. The method of claim 1, wherein the counterweight is curved, the curvature of the inner surface of the counterweight having a radius that is greater than the radius of the tubular aluminum drive shaft.

9. The method of claim 8, wherein the transition material is curved, the curvature of the projection on the first surface of the transition material having a radius that is the same as the radius of the inner surface of the counterweight, and the curvature of the second surface of the transition material having a radius that is the same as the radius of the tubular aluminum drive shaft.

10. The method of claim 1, further comprising the step of tack welding the transition material to the counterweight before the step of resistance welding the counterweight to the aluminum drive shaft.

11. The method of claim 1, further comprising the step of maintaining the pressure on the outer surface of the counterweight against the aluminum drive shaft after the current is turned off.

12. A drive shaft comprising:

an aluminum tube having an outer surface facing radially away from an axis about which the drive shaft rotates, a steel counterweight having an inner surface and an outer surface, the inner surface of the counterweight being attached to the outer surface of the aluminum tube by resistance welding, a transition material disposed between the outer surface of the aluminum tube and the inner surface of the counterweight, the transition material having a first surface adjacent to the inner surface of the steel counterweight and a second surface adjacent to the outer surface of the aluminum tube, the first surface being steel and having an outward projection thereon and the second surface being aluminum without outward projections in an area to be welded; and a steel-steel bond formed between the inner surface of the counterweight and the first surface of the transition material, and an aluminum-aluminum bond formed between the second surface of the transition material and the outer surface of the aluminum tube by passing an electrical current through the counterweight, the transition material, and the aluminum tube while maintaining pressure on the outer surface of the counterweight against the aluminum tube.

13. The drive shaft of claim 12, wherein the transition material has at least two layers including a steel layer at the first surface and an aluminum layer at the second surface.

14. The drive shaft of claim 13, wherein the transition material has a plurality of aluminum layers of varying grades of aluminum.

15. The drive shaft of claim 13, wherein the steel layer has a thickness that is less than the thickness of the counterweight.

16. The drive shaft of claim 12, wherein the outward projection is in the shape of a ring having an opening in one part of the ring.

17. The drive shaft of claim 12, wherein the outward projection is formed by stamping the transition material.

18. The drive shaft of claim 12, wherein the transition material has a plurality of outward projections on the first surface of the transition material.

19. The drive shaft of claim 12, wherein the counterweight is curved, the curvature of the inner surface of the counterweight having a radius that is greater than the radius of the aluminum tube.

20. The drive shaft of claim 19, wherein the transition material is curved, the curvature of the projection on the first surface of the transition material having a radius that is the same as the radius of the inner surface of the counterweight, and the curvature of the second surface of the transition material having a radius that is the same as the radius of the aluminum tube.

21. A metallic composite adapted for attachment to a tubular aluminum drive shaft by resistance welding for balancing the aluminum drive shaft during rotation, the aluminum drive shaft having an outer surface facing radially away from an axis about which the aluminum drive shaft rotates, comprising:
a steel counterweight having an inner surface,
a transition material having a first surface and a second surface, the first surface being steel and having an outward projection thereon and the second surface being aluminum without outward projections in an area to be welded, the first surface being tack welded to the inner surface of the counterweight.

22. The metallic composite of claim 21, wherein the transition material has at least two layers including a steel layer at the first surface and an aluminum layer at the second surface.

23. The metallic composite of claim 22, wherein the transition material has a plurality of aluminum layers of varying grades of aluminum.

24. The metallic composite of claim 22, wherein the steel layer has a thickness that is less than the thickness of the counterweight.

25. The metallic composite of claim 21, wherein the outward projection is in the shape of a ring having an opening in one part of the ring.

26. The metallic composite of claim 21, wherein the outward projection is formed by stamping the transition material.

27. The metallic composite of claim 21, wherein the transition material has a plurality of outward projections on the first surface of the transition material.

28. The metallic composite of claim 21, wherein the steel counterweight is curved, the curvature of the inner surface of the counterweight having a radius that is greater than the radius of the aluminum drive shaft.

29. The metallic composite of claim 28, wherein the transition material is curved, the curvature of the projection on the first surface of the transition material having a radius that is the same as the radius of the inner surface of the counterweight, and the curvature of the second surface of the transition material having a radius that is the same as the radius of the drive shaft.

30. A method of attaching a steel counterweight to a tubular aluminum drive shaft, the steel counterweight having an inner surface and an outer surface, and the aluminum drive shaft having an outer surface facing radially away from an axis about which the aluminum drive shaft rotates, the method comprising the steps of:
forming an outward projection on the inner surface of the steel counterweight;
disposing a transition material between the outer surface of the aluminum drive shaft and the inner surface of the steel counterweight, the transition material having a first surface adjacent to the inner surface of the steel counterweight and a second surface adjacent to the outer surface of the aluminum drive shaft, the first surface being steel and the second surface being aluminum, both the first and second surfaces without outward projections in an area to be welded; and
resistance welding the counterweight to the aluminum drive shaft by passing an electrical current through the counterweight, the transition material, and the aluminum drive shaft while maintaining pressure on the outer surface of the counterweight against the drive shaft, thereby creating a steel-steel bond between the inner surface of the counterweight and the first surface of the transition material and an aluminum-aluminum bond between the second surface of the transition material and the outer surface of the aluminum drive shaft.

31. The method of claim 30, wherein the transition material has at least two layers including a steel layer at the first surface and an aluminum layer at the second surface.

32. The method of claim 31, wherein the steel layer has a thickness that is less than the thickness of the counterweight.

33. The method of claim 31, wherein the transition material has a plurality of aluminum layers of varying grades of aluminum.

34. The method of claim 30, wherein the outward projection is in the shape of a ring.

35. The method of claim 30, wherein the outward projection is formed by stamping the steel counterweight.

36. The method of claim 30, wherein the steel counterweight has a plurality of outward projections on the inner surface of the steel counterweight.

37. The method of claim 30, wherein the transition material is curved, the curvature of the second surface of the transition material having a radius that is the same as the radius of the tubular aluminum drive shaft.

38. The method of claim 37, wherein the counterweight is curved, the curvature of the inner surface of the counterweight having a radius that is greater than the radius of the tubular aluminum drive shaft, and the curvature of the projection on the inner surface of the steel counterweight having a radius that is approximately the same as the radius of the first surface of the transition material.

39. The method of claim 30, further comprising the step of tack welding the transition material to the counterweight before the step of resistance welding the counterweight to the aluminum drive shaft.

40. The method of claim 30, further comprising the step of maintaining the pressure on the outer surface of the counterweight against the aluminum drive shaft after the current is turned off.

41. A drive shaft comprising:
   an aluminum tube having an outer surface facing radially away from an axis about which the drive shaft rotates,
   a steel counterweight having an inner surface and an outer surface, the inner surface of the counterweight having a projection thereon and being attached to the outer surface of the aluminum tube by resistance welding;
   a transition material disposed between the outer surface of the aluminum tube and the inner surface of the counterweight, the transition material having a first surface adjacent to the inner surface of the steel counterweight and a second surface adjacent to the outer surface of the aluminum tube, the first surface being steel and the second surface being aluminum, both the first and second surfaces without outward projections in an area to be welded; and
   a steel-steel bond formed between the inner surface of the counterweight and the first surface of the transition material, and an aluminum-aluminum bond formed between the second surface of the transition material and the outer surface of the aluminum tube by passing an electrical current through the counterweight, the transition material, and the aluminum tube while maintaining pressure on the outer surface of the counterweight against the aluminum tube.

42. The drive shaft of claim 41, wherein the transition material has at least two layers including a steel layer at the first surface and an aluminum layer at the second surface.

43. The drive shaft of claim 42, wherein the transition material has a plurality of aluminum layers of varying grades of aluminum.

44. The drive shaft of claim 42, wherein the steel layer has a thickness that is less than the thickness of the counterweight.

45. The drive shaft of claim 41, wherein the outward projection is in the shape of a ring.

46. The drive shaft of claim 41, wherein the outward projection is formed by stamping the steel counterweight.

47. The drive shaft of claim 41, wherein the steel counterweight has a plurality of outward projections on the inner surface of the steel counterweight.

48. The drive shaft of claim 41, wherein the transition material is curved, the curvature of the second surface of the transition material having a radius that is the same as the radius of the aluminum tube.

49. The drive shaft of claim 48, wherein the steel counterweight is curved, the curvature of the inner surface of the counterweight having a radius that is greater than the radius of the aluminum tube, and the curvature of the projection on the inner surface of the steel counterweight having a radius that is approximately the same as the radius of the first surface of the transition material.

50. A metallic composite adapted for attachment to a tubular aluminum drive shaft by resistance welding for balancing the aluminum drive shaft during rotation, the aluminum drive shaft having an outer surface facing radially away from an axis about which the aluminum drive shaft rotates, comprising:
   a steel counterweight having an inner surface and an outer surface, the inner surface of the counterweight having a projection thereon;
   a transition material having a first surface and a second surface, the first surface being steel and the second surface being aluminum, both the first and second surfaces without outward projections in an area to be welded, the first surface being tack welded to the inner surface of the counterweight.

51. The metallic composite of claim 50, wherein the transition material has at least two layers including a steel layer at the first surface and an aluminum layer at the second surface.

52. The metallic composite of claim 51, wherein the transition material has a plurality of aluminum layers of varying grades of aluminum.

53. The metallic composite of claim 51, wherein the steel layer has a thickness that is less than the thickness of the counterweight.

54. The metallic composite of claim 50, wherein the outward projection is in the shape of a ring.

55. The metallic composite of claim 50, wherein the outward projection is formed by stamping the steel counterweight.

56. The metallic composite of claim 50, wherein the steel counterweight has a plurality of outward projections on the inner surface of the steel counterweight.

57. The metallic composite of claim 50, wherein the transition material is curved, the curvature of the second surface of the transition material having a radius that is the same as the radius of the drive shaft.

58. The metallic composite of claim 57, wherein the steel counterweight is curved, the curvature of the inner surface of the counterweight having a radius that is greater than the radius of the aluminum drive shaft, and the curvature of the projection on the inner surface of the steel counterweight having a radius that is approximately the same as the radius of the first surface of the transition material.

59. A method of attaching a steel counterweight to a tubular aluminum drive shaft, the steel counterweight having an inner surface and an outer surface, and the aluminum drive shaft having an outer surface facing radially away from an axis about which the aluminum drive shaft rotates, the method comprising the steps of:
   disposing a transition material between the outer surface of the aluminum drive shaft and the inner surface of the steel counterweight, the transition material having a first surface adjacent to the inner surface of the steel counterweight and a second surface adjacent to the outer surface of the aluminum drive shaft, the first surface being steel and the second surface being aluminum, the transition material further having at least two layers including a steel layer the first surface and aluminum layer at the second surface;
   forming a steel projection between the inner surface of the counterweight and the first surface of the transition material for concentrating heat generation in the steel counterweight at a steel-steel bond formed between the inner surface of the counterweight and the first surface of the transition material and preventing excess heat from being transmitted to an aluminum-aluminum bond formed between the second surface of the transition material and the outer surface of the aluminum drive shaft when the counterweight is resistance welded to the aluminum drive shaft; and
   resistance welding the counterweight to the aluminum drive shaft passing an electrical current through the counterweight, the transition material, and the aluminum drive shaft while maintaining pressure on the outer surface of the counterweight against the drive shaft, thereby creating the steel-steel bond between the inner surface of the counterweight and the first surface of the transition material and the aluminum-aluminum bond between the second surface of the transition material and the outer surface of the aluminum drive shaft.

60. A drive shaft comprising:

an aluminum tube having an outer surface facing radially away from an axis about which the drive shaft rotates;

a steel counterweight having an inner surface and an outer surface, the inner surface of the counterweight being attached to the outer surface of the aluminum tube by resistance welding;

a transition material disposed between the outer surface of the aluminum tube and the inner surface of the counterweight, the transition material having a first surface adjacent to the inner surface of the steel counterweight and a second surface adjacent to the outer surface of the aluminum tube, the first surface being steel and the second surface being aluminum, the transition material further having at least two layers including a steel layer at the first surface and an aluminum layer at the second face; and a steel projection between the inner surface of the counterweight and the first surface of the transition material for concentrating heat generation in the steel counterweight at a steel-steel bond formed between the inner surface of the counterweight and the first surface of the transition material and preventing excess heat from being transmitted to an aluminum-aluminum bond formed between the second surface of the transition material and the outer surface of the aluminum tube when the counterweight is resistance welded to the aluminum tube by passing an electrical current through the counterweight, the transition material, and the aluminum tube while maintaining pressure on the outer surface of the counterweight against the aluminum tube.

61. A metallic composite adapted for attachment to a tubular aluminum drive shaft by resistance welding for balancing the aluminum drive shaft during rotation, the aluminum drive shaft having an outer surface facing radially away from an axis about which the aluminum drive shaft rotates, comprising:

a steel counterweight having an inner surface;

a transition material having first surface and a second surface, the first surface being steel and the second surface being aluminum, the transition material further having at least two layers including a steel layer at the first surface and an aluminum layer at the second surface; and a steel projection between the inner surface of the counterweight and the first surface of the transition material for concentrating heat generation in the steel counterweight at a steel-steel bond formed between the inner surface of the counterweight and the first surface of the transition material and preventing excess heat from being transmitted to an aluminum-aluminum bond formed between the second surface of the transition material and the outer surface of the aluminum drive shaft when the counterweight is resistance welded to the aluminum drive shaft.

* * * * *